United States Patent [19]
Bent

[11] Patent Number: 5,038,717
[45] Date of Patent: Aug. 13, 1991

[54] DEVICE FOR TRAINING RETRIEVER DOGS

[76] Inventor: Judith Bent, 826 Dearborn Ave., N.E., Keizer, Oreg. 97303

[21] Appl. No.: 542,314

[22] Filed: Jun. 22, 1990

[51] Int. Cl.⁵ .............................................. A01K 15/00
[52] U.S. Cl. ...................................... 119/29; 119/129
[58] Field of Search ............... 119/29, 129, 109, 96; 54/8, 71, 7

[56] References Cited

U.S. PATENT DOCUMENTS

| | | | |
|---|---|---|---|
| 137,913 | 4/1873 | Ginkinger | 54/7 |
| 369,490 | 9/1887 | Williams et al. | 54/7 |
| 623,333 | 4/1899 | Payne | 54/8 |
| 699,947 | 5/1902 | Ellis | 119/129 |
| 745,806 | 12/1903 | Erb, Jr. | 119/29 |
| 891,089 | 6/1908 | Mason | 54/8 |
| 917,951 | 4/1909 | Krause | 54/8 |
| 1,014,264 | 1/1912 | Siner | |
| 1,685,435 | 9/1928 | Philbrick | 119/96 |
| 2,421,173 | 5/1947 | Ulrich | 54/7 |
| 2,728,326 | 12/1955 | Andrew | 119/129 |
| 2,758,565 | 8/1956 | Mracek | 119/29 |
| 2,790,418 | 4/1957 | Boling | 119/107 |
| 2,844,142 | 1/1958 | Gibbons | 128/12 |
| 2,982,249 | 5/1961 | Smith | 119/129 |
| 3,318,069 | 5/1967 | Cunard | 54/6 |
| 3,401,500 | 9/1968 | Wright | 54/6 |

FOREIGN PATENT DOCUMENTS

| | | | |
|---|---|---|---|
| 126737 | 10/1928 | Switzerland. | |
| 3123047 | 3/1964 | Switzerland | 119/29 |
| 3906707 | 9/1975 | Switzerland | 119/29 |

Primary Examiner—Paul J. Hirsch
Attorney, Agent, or Firm—Chernoff, Vilhauer, McClung & Stenzel

[57] ABSTRACT

A device for retaining a training object in a dog's mouth and a method for its use for training a dog to carry an object such as a small game animal or bird. An adjustable halter fits about the dog's head and includes retainer straps extending on each side of the dog's muzzle to be attached to an object such as a training dummy to be held in the dog's mouth. A belt may be placed around the dog's chest with a restraining strap extending from the belt and between the dog's front legs to the halter, to keep the dog's head down.

8 Claims, 2 Drawing Sheets

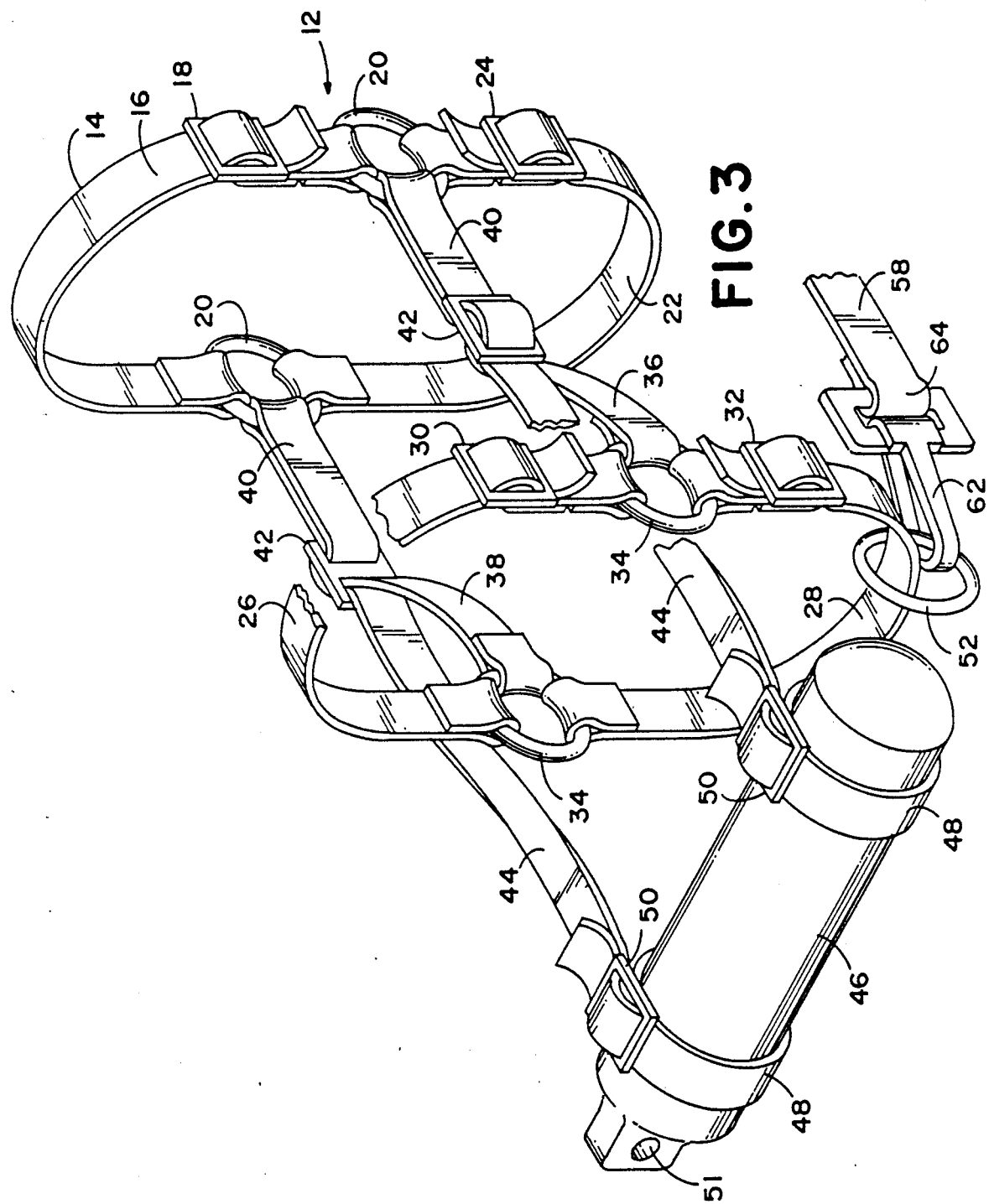

DEVICE FOR TRAINING RETRIEVER DOGS

BACKGROUND OF THE INVENTION

The present invention relates to devices for training receiver dogs, and particularly to a device for training a retriever dog to carry a small animal or bird in its mouth until told to drop it.

In training retrieving dogs for use in hunting, it is necessary to train them not only to find game after it has been injured or killed, but to retrieve on an injured or killed animal or bird by carrying it in its mouth back to the dog's controller. Some dogs also need to be taught to keep their heads down while searching for game and not to toss their heads while carrying the game, and it is necessary to train some dogs not to damage the animal or bird by shaking it unnecessarily as it is being carried. Dogs naturally want to play with an animal, by a shaking or tossing of the dog's head, but such treatment of a small animal or bird can damage the flesh, making it less desirable to eat. Ideally, a retriever dog will quickly locate and gently retrieve an animal or bird which has been shot, and will release it upon the controller's command. Until commanded to drop the animal, bird, or object, however, the retriever should continue to hold it in its mouth.

While some dogs naturally like to retrieve objects, others may be likely to drop objects before they have been brought to the dog's controller. What is needed, then, is a way to teach such dogs to continue to carry an object, and to accustom such dogs to carrying objects in their mouths for longer amounts of time.

Various devices are known for holding an object in or near an animal's mouth, as shown, for example, in Andrew U.S. Pat. No. 2,728,326; Smith U.S. Pat. No. 2,982,249, Swiss Patent No. 126,737, and Cunard U.S. Pat. No. 3,318,069. However, none of the previously known devices are adapted for use in training a dog to carry an object in its mouth until instructed to drop the object.

What is needed, then, is a simple device to use in training a retriever dog to carry a bird or small animal properly without dropping or shaking it.

SUMMARY OF THE INVENTION

The present invention provides a training device and a method for its use for training retriever dogs to hold and carry a small game animal or bird. In accordance with the present invention a halter-like device is adjustable to fit securely around a dog'head and includes separate retainer extensions on its sides which fit removably about an object to be held in a dog's mouth to simulate a small animal or bird.

In a preferred embodiment of the invention a belt is provided around the dog's chest, and a separate restraint extends forward from the bottom of the belt, between the dog's front legs, and is attached to the halter to keep the dog from tossing its head. This may als be used to train a dog to keep its head down while searching for game.

In a preferred embodiment of the invention flexible web strapping material is interconnected with buckles and harness rings to provide an adjustable halter, and extensions of side straps of the halter are provided with buckles forming loops to attach to an object to be used to simulate a game animal or bird. Preferably, a generally cylindrical device resembling a small boat bumper slightly modified in design for use as a training dummy is held in the dog's mouth by the device of the invention.

In a preferred embodiment of the invention the halter and the retaining extensions of the side pieces of the halter are adjustable in length by conventional three-bar buckles.

In accordance with the method of the present invention the device of the invention is used to hold the training dummy in the dog's mouth in the early stages of training the dog for hunting, so that the dog will become accustomed to having to carry something in its mouth, and can be trained also to release and drop the object upon command.

It is therefore a principal object of the present invention to provide a device to assist in training a dog to carry game.

It is another important object of the present invention to provide a method for training a dog to carry a bird or small game animal in its mouth until commanded to release it.

A further object of the present invention is to teach a dog to carry small game without damaging it.

It is an important feature of the present invention that it provides a device for holding a training dummy in a dog's mouth until the dog becomes accustomed to carrying something in its mouth for extended periods of time, until told to release it.

It is a further feature of the present invention that it includes a belt, and a flexible restraint extending forward from the belt, between the dog's legs to the halter portion of the device, to restrain movement of the dog's head.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is a perspective view, at an enlarged scale, showing the halter portion of the dog training device illustrated in FIGS. 1 and 2.

DETAILED DESCRIPTION OF THE INVENTION

Figure 1:
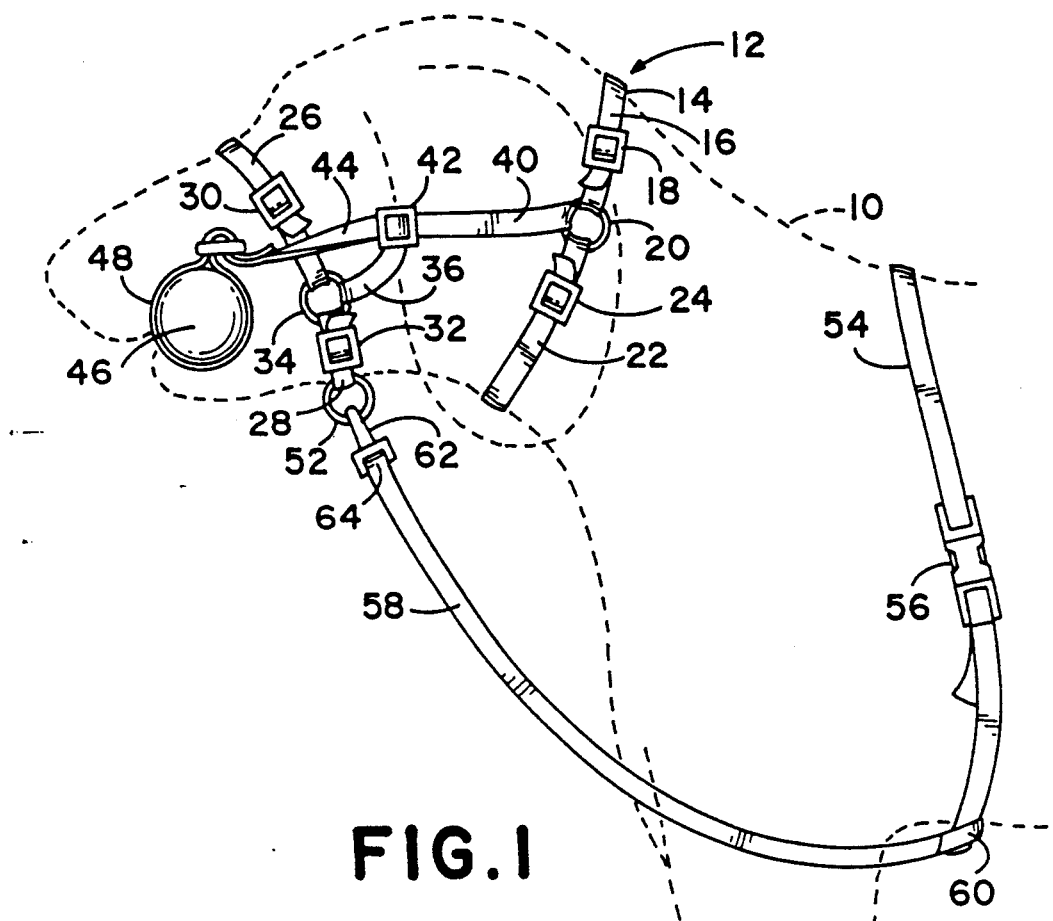
FIG. 1 is a view of a training device embodying the present invention, being worn by a dog shown in broken line.
Figure 2:
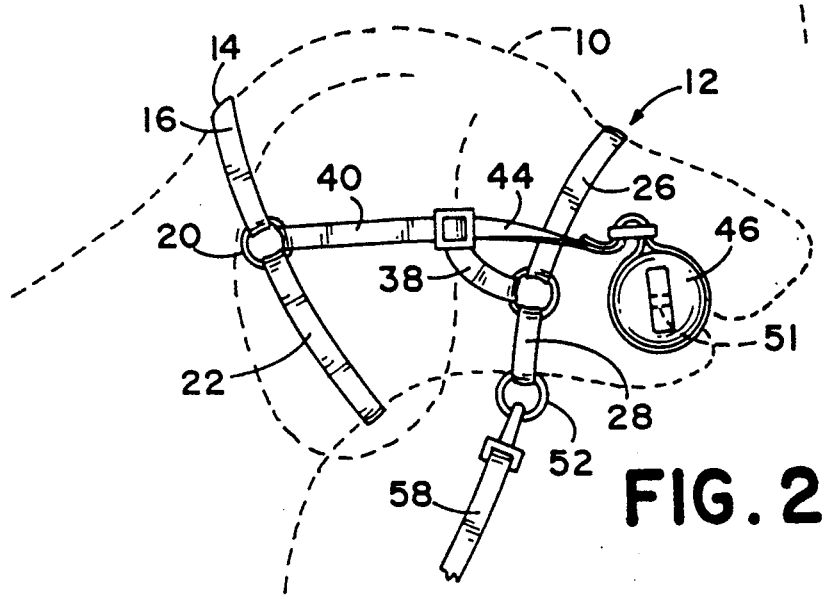
FIG. 2 is a view of a right side of the halter portion of the dog training device shown in FIG. 1, with a dog's head and neck shown in broken line.

Referring now to the drawings which form a part of the disclosure, in FIG. 1 a dog 10 is shown wearing a training device 12 embodying the present invention. The training device 12 includes an adjustable halter portion 14. A head strap 16 fits over the rear of the dog's head and is adjustable in length by means of a buckle 18. The opposite ends of the head strap 16 are attached to respective harness rings 20, one being located on each side of the halter portion 14. A throat strap 22, adjustable in effective length by means of a buckle 24, also has its opposite ends attached to respective ones of the rings 20.

A muzzle portion of the halter portion 14 includes an upper muzzle strap 26 and a lower muzzle strap 28, which are adjustable respectively by means of buckles 30 and 32. The upper and lower muzzle straps 26, 28, have their opposite ends connected to respective ones of a pair of harness rings 34.

A pair of side straps 36, 38 each have a first end attached to one of the harness rings 34, as by being looped through the respective ring 34 and sewn to fixedly attach the end of the respective side strap 36 or 38 to the ring 34. Thence the side straps 36, 38 each extend to a corresponding one of the harness rings 20, forming respective adjustable loop portions 40 extending through the respective ones of the rings 20 and held adjustably by respective buckles 42.

An extension portion 44 of each side strap 36, 38 extends downwardly from the respective buckle 42 and is fastened around a retrieving training dummy 46 forming a loop 48 held in place by a respective buckle 50 located beside the dog's muzzle, so that the training dummy 46 is held in place extending from side to side with a central portion of the training dummy 46 being in the dog's mouth. The location of the buckle 50 on each side is adjusted to that the training dummy 46 will not fall out of the dog's mouth when the dog relaxes his holding grip on it. As a result, the dog will become accustomed to having the training dummy 46 in his mouth while it is held there by the training device 12.

A suitable training dummy 46 may be generally cylindrical in shape, and of an inflatable type often called a bumper. Such a device closely resembles a small pneumatic boat fender and may similarly include an eye 51 to which a cord may be attached, either to toss the training dummy into the air or for the purpose of dragging the training dummy 46 during the process of training the dog to find and retrieve a small animal or bird which has been killed or injured by a hunter.

A harness ring 52 encircles the lower muzzle strap 28 beneath the dog's jaw. A belt or chest strap 54 extends around the dog's chest, and over the shoulders, where it is held in place by being adjusted to the proper size. The chest strap 54 is, preferably, quickly releasable, as by the use of a side release buckle 56, which not only permits adjustment of the tightness of the chest strap 54, but permits it to be removed and replaced conveniently. Extending from the chest strap 54 to the ring 52 is a head restraining strap 58, or hold-down strap, whose rear end 60 is attached to the chest strap 54. A snap hook 62 is mounted on the forward end 64 of the head restraining strap 58 and is engaged in the ring 52.

In order not to damage game being retrieved, the dog should not shake the animal or bird by tossing his head, and so the head restraining or hold down strap 58 may be used to limit the dog's ability to shake or toss its head. The length of the head restraining strap 58 is chosen, or may be adjusted by means of an appropriate buckle (not shown) to prevent the dog 10 from raising his head too high, as particularly by tossing his head or throwing his head upward. Thus, the dog 10 will be trained not to toss his head upward as an untrained dog might do in the natural fashion of shaking a small animal which has been caught. This may also help in training a dog to keep its head down to find the scent of an injured bird or animal.

The training device 12 is particularly useful in the earliest stages of training a retrieving dog, when it is important for the dog to learn to retrieve a small animal or bird which it has found, carrying it back to the hunter and keeping the game in its mouth until instructed to release it by the dog's controller.

Once the dog 10 has becomne accustomed to carrying the training dummy 46 with the retaining strap extension portions 44 of the side straps attached to the training dummy 46, training can continue by having the dog carry the training dummy 46 with the loops 48 of the extension portions 44 of the side straps 36, 38 more loosely fitted about the training dummy, so that the dog will learn that he must continue to hold the training dummy 46 to retain it in his mouth. The loops 48 can be pushed aside by the trainer before he or she commands the dog 10 to drop the dummy 46.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A device for use in training retriever dogs, comprising:
    (a) adjustable halter means for fitting on a dog's head;
    (b) a pair of retaining means attached to said halter means, a respective one of said pair extending along each side of the dog's muzzle, for selectively and releasably holding a retrieval training object extending between the ones of said pair and between said dog's jaws; and
    (c) a retrieval training object releasably held by said retaining means and extending within said dog's mouth between its jaws.

2. The device of claim 1 wherein said retaining means includes a strap and buckle means for holding said strap with a portion thereof extending around a portion of said training object alongside said muzzle of the dog.

3. The device of claim 1 wherein said training object is a generally cylindrical training dummy of resilient material.

4. The device of claim 1, further including belt means for extending around said dog's chest and shoulders behind said dog's front legs, and flexible hold-down means, extending from said belt means forward between said dog's front legs to a portion of said halter means located beneath said dog's muzzle, for preventing said dog from throwing its head upward.

5. The device of claim 1 wherein said halter means includes a pair of adjustable side straps and said pair of retaining means are extensions of said side straps.

6. The device of claim 1 wherein said halter means is adjustable to fit dogs of a variety of sizes.

7. A method of training a dog to retrieve downed game and the like, comprising:
    (a) placing a halter on a dog's head;
    (b) providing a training object as a simulation of a small game animal or bird to be carried by the dog;
    (c) placing the training object in the dog's mouth;
    (d) providing separate first and second retainers each interconnected with a respective side of the halter;
    (e) attaching the first retainer to the training object on a first side of the dog's muzzle and the second retainer to the training object on the other side of the dog's muzzle, so as to keep the training object in the dog's mouth for a period of time;
    (f) thereafter releasing the object from the retainers; and
    (g) thereafter commanding the dog to drop the training object.

8. The method of claim 7, including the further steps of fitting a strap around the dog behind its front legs and attaching a flexible restraint to the belt and the halter, interconnecting them so as to prevent the dog from raising its head beyond a predetermined position.

* * * * *

UNITED STATES PATENT AND TRADEMARK OFFICE
CERTIFICATE OF CORRECTION

PATENT NO. : 5,038,717
DATED : August 13, 1991
INVENTOR(S) : Judith Bent

It is certified that error appears in the above-identified patent and that said Letters Patent is hereby corrected as shown below:

Col. 1, line 6   Change "receiver" to --retriever--;

line 36   Change "126,737" to --125,737--;

line 50   Change "dog'head" to --dog's head--;

line 59   Change "als" to --also--.

Col. 3, line 20   Change "to" to --so--;

line 35   Change "the" to --his--;

line 65   Change "becomne" to --become--.

Signed and Sealed this

Sixteenth Day of February, 1993

Attest:

STEPHEN G. KUNIN

*Attesting Officer*   Acting Commissioner of Patents and Trademarks